April 20, 1937.    D. HEYER    2,078,196
VARIABLE SPEED POWER UNIT
Original Filed Nov. 1, 1932    3 Sheets—Sheet 1

April 20, 1937.  D. HEYER  2,078,196

VARIABLE SPEED POWER UNIT

Original Filed Nov. 1, 1932  3 Sheets-Sheet 3

Patented Apr. 20, 1937

2,078,196

UNITED STATES PATENT OFFICE 2,078,196

VARIABLE SPEED POWER UNIT

Don Heyer, Los Angeles, Calif., assignor to U. S. Electrical Motors, Inc., a corporation of California Application November 1, 1932, Serial No. 640,707
Renewed December 28, 1936

24 Claims. (Cl. 74—230.17)

This invention relates to a power unit, and more particularly to a compact arrangement incorporating an electric motor drive, and an adjustable speed drive from the motor to a shaft extending externally of the power unit.

Preferably the variation in speed is obtained by the aid of a pulley structure and a belt, in which the effective diameter of the pulley structure is variable. In the present instance, this pulley structure is generally similar to that shown in my prior application, Serial No. 519,764, filed March 3, 1931, and entitled Variable speed transmission device, of which this application is a continuation in part. The prior application has since issued as Patent No. 1,993,547, dated March 5, 1935.

This application is also a continuation in part of another prior application, Serial No. 452,108, filed May 13, 1930 and entitled Variable speed transmission device.

In the present instance, the motor shaft carries an adjustable pulley structure, and this structure is connected by a belt with a similar pulley structure on a driven shaft. Each of the pulley structures includes a pair of pulley sections having opposed inclined faces, and axially adjustable toward and from each other. As the sections move together, a belt in driving contact with both of the inclined faces, is moved by the sections radially outwardly, thereby increasing the effective diameter. Conversely, a separation of the sections permits the belt to move inwardly, to contact with the faces on a smaller effective diameter.

In order to keep the belt in tightened condition at all times, the two pulley structures (driving and driven) are arranged to be oppositely adjustable; that is an increase in effective diameter of the driven pulley structure is automatically accompanied by a decrease in effective diameter of the driving pulley structure.

It is one of the objects of this invention to improve and simplify in general, this type of variable speed drive.

It is another object of the invention to provide a unit in which the speed of the driven shaft is less or never exceeds that of the driving shaft.

It is still another object of this invention to provide a compact power unit having a housing or casing that protects substantially all of the working parts, and that yet permits ready adjustment or replacement, of such elements as the electric motor, the pulley structure, or the belt.

It is still another object of this invention to simplify the construction of the adjustable pulley structure, especially applicable to structures supported on the end of a shaft, such as a shaft extending from an electric motor housing.

In order to make it possible to increase the effective pulley diameter to a desired maximum, it is necessary to bring the pulley sections close together. It has been proposed to provide radial slots in the pulley faces to permit the faces to interlock for adjustments neighboring the maximum diameter setting. When the setting is such that the outer edge of the belt is coincident with the outer edges of the slots, the belt has a tendency to stick under these slot edges, causing the belt to be carried around the pulley beyond the point where it should tangentially leave the pulley surface. This action produces undue wear on the belt. It is another object of this invention to obviate this belt sticking tendency, and thereby prolonging the life of the belt.

This invention possesses many other advantages, and has other objects which may be made more easily apparent from a consideration of one embodiment of the invention. For this purpose there is shown a form in the drawings accompanying and forming part of the present specification. This form shall now be described in detail, illustrating the general principles of the invention; but it is to be understood that this detailed description is not to be taken in a limiting sense, since the scope of the invention is best defined by the appended claims.

Referring to the drawings.

Figure 1:
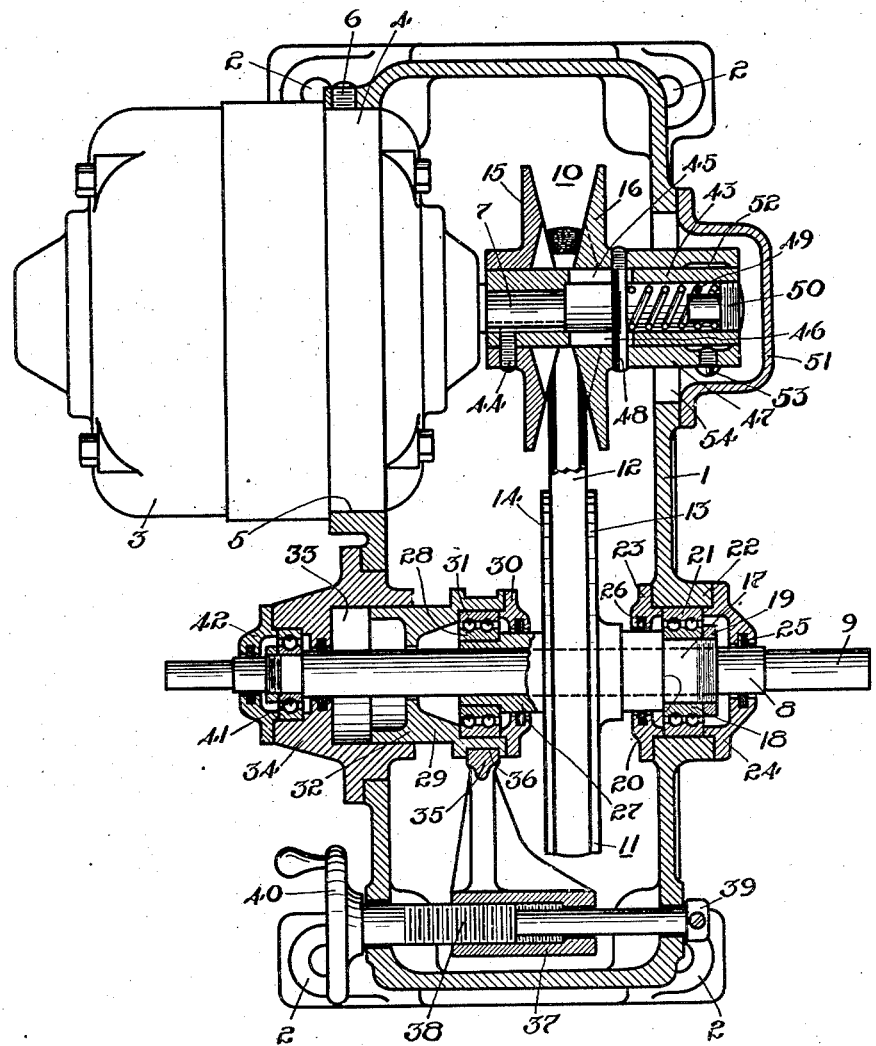
Figure 1 is a view, mainly in horizontal section, of a power unit embodying the invention.
Figure 2:
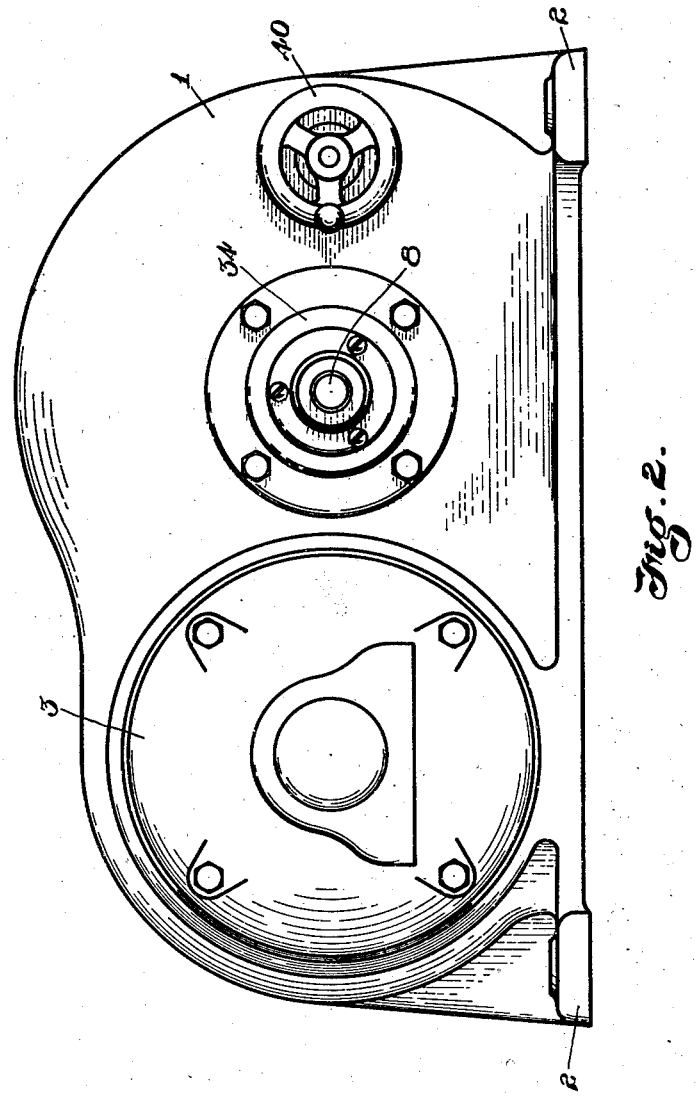
Fig. 2 is a side elevation thereof.

In the present instance, a casing I is provided, in which substantially all of the operating parts of the device are accommodated. This casing can be provided with appropriate feet, such as 2, by the aid of which it may be fastened to a supporting base.

In order to provide the motive power for the unit, an electric motor 3 is supported by the casing. The manner in which the motor 3 is supported will now be described.

Motor 3 is shown as being of the enclosed type, having substantially cylindrical frame portions. A cylinder surface 4 of the frame is telescoped inside of a flanged aperture 5 in the left hand side of the frame I, and the motor is held tightly in the said aperture, as by the aid of one or more set screws 6. It is thus apparent that the motor 3 extends partly into the casing 1. This motor has a shaft 7 which extends out of the motor frame and inside of the casing 1. This shaft can thus be designated as the driving shaft.

A driven shaft 8 has an axis parallel with the axis of shaft 7, and may be appropriately supported as hereinafter described, in the casing 1. It may be provided with an extension 9 projecting out of the casing 1, so as to be available for supplying power to a load.

On each of the shafts 7 and 8 is supported an adjustable pulley structure 10 and 11 respectively. Each of these pulley structures may include an axially fixed section and an axially adjustable section, each of the sections having opposed inclined faces. The pulley structures are connected by a flexible V-belt 12, and the arrangement is such that adjustment of the effective diameter of one pulley structure automatically causes a converse adjustment of the effective diameter of the other pulley structure. Thus assuming for example that the right hand section 13 of pulley structure 11 is axially fixed with respect to shaft 8, then the left hand section 14 is arranged to be moved toward and from the section 13, respectively to increase and to decrease the pulley diameter. In the corresponding pulley structure 10, the left hand section 15 is axially fixed and the right hand pulley section 16 is adjustable toward and from the section 15. In this way, as the ratio of transmission is varied, the belt 12 moves in a direction parallel to the axes of the shafts and stays in alinement with both pulley structures. This is all now well understood, and is disclosed in my prior application Serial No. 519,764.

In the present instance, the effective diameter of pulley structure 11 is arranged to be manually adjusted in a manner now to be described. This is accomplished by moving the pulley section 14 in an axial direction. When this movement is in progress, the movable pulley section 16 of the driving pulley 10 is automatically adjusted to comply with the belt requirements for the particular adjustment.

In order to explain how pulley structure 11 may be adjusted, the manner of supporting the driven shaft 8 and the pulley sections 13 and 14 by the aid of the casing 1 will be described. One of the features of the invention is the capability of removing shaft 8 completely, while yet maintaining the pulley sections 13 and 14 inside of the casing and in alined relation. For this purpose shaft 8 is splined through both sections 13 and 14, but is otherwise not connected to the sections. Supplemental means are used to prevent axial movement of shaft 8 and section 13 with respect to casing 1. Thus the hub portion 17 of the section 13 is supported by appropriate bearings. In this way, no bearing for directly supporting shaft 8 is required. In the present instance this bearing support comprises a thrust ball bearing. The inner race 18 of the ball bearing structure is driven on hub 17 and may be held still more securely in place as by the aid of a lock nut 19 threaded on the end of the hub, and jamming the inner race 18 against a shoulder 20 on the hub. The outer race 21 of ball bearing structure is held in axial alinement in an apertured boss 22 in the right hand wall of casing 1. An interior cap 23 and an exterior cap 24 respectively both have flanges telescoping into the apertured boss 22 and confine the outer race 21 against axial movement. In order to confine any lubricant that may be used in connection with the ball bearings against escape, the usual felt washers 25 and 26 can be provided in grooves in the inner edges of the caps 23 and 24.

It is apparent that section 13 is confined against axial movement by the bearing structure. However, since shaft 8 is splined through section 13, rotation of the section 13 will of course impart rotation to shaft 8.

The movable section 14 is also splined to shaft 8. This section also has a hub 27 which may be supported in thrust ball bearings in a manner similar to the bearing structure just described for the section 13. In this case, however, the entire bearing structure is arranged to be adjusted, whereby axial motion of the bearing structure will cause corresponding axial motion of section 14. Thus the hub 27 can carry the inner race 28 of the ball bearings, the outer race 31 being accommodated in a support 29. A cap 30 can be fastened to this support for confining the outer race against axial movement.

Support 29 is arranged to be axially adjusted. For this purpose, it may be guided by the aid of a cylindrical extension 32 in a recess 33. This recess is formed in a removable boss 34 fastened to the left hand wall of casing 1. The axial adjustment is accomplished by the aid of a shift fork engaged in the annular groove 36 in the support 29. This shift fork has a threaded boss 37 forming a nut in which a lead screw 38 is engaged. This lead screw 38 has an extension that projects through the right hand wall of casing 1. The screw 38 is appropriately supported and journalled in the walls thereof. It is confined against axial movement as by the aid of a collar 39. Furthermore, its extension serves as a journal support for the right hand extremity of the boss 37, through which a cylindrical bearing aperture is provided for sliding on the extension.

The left hand end of the lead screw 38 is journalled in the left hand wall of casing 1 and extends through this wall. On this extension can be carried a manually operable member, such as a hand wheel 40. It is apparent that by turning hand wheel 40, the axial position of supporting member 29 can be adjusted, and accordingly the axial position of pulley section 14.

It is apparent that the two bearing structures respectively supporting the hub of sections 13 and 14 are all that are required for adequately supporting the entire driven structure including shaft 8. In the present instance, however, a third ball bearing structure is provided near the left hand of shaft 8, but which may be omitted if desired. This ball bearing structure is shown at 41. Its outer race may be supported in the removable boss 34 and its inner race on an appropriate shoulder on shaft 8. Cap 42 can be provided, having a construction and purpose similar to the caps 23, 24 and 30. Ball bearings 41 also serve the purpose of confining shaft 8 against axial movement.

It is apparent that by removing boss 34, the shaft 8 can be axially removed with this bearing boss from sections 13 and 14. This capability is made use of to permit belt removal and replacement in a manner to be hereinafter described.

The driven shaft and its associated parts have now been described. The mechanism for driving this structure can now be detailed in full.

The motor shaft 7 is provided with an extension, such as the tubular extension 43, upon which the axially adjustable section 16 may be slidably supported. In order to hold this tubular extension in place, as well as the axially fixed section 15, use can be made of a slot and key connection, supplemented by a set screw 44.

The tubular extension 43 is provided with a pair of diametrically opposite elongated slots 45 and 46. Passing through these slots and carried by the hub 47 of section 16 is a keying member, such as a pin 48. This pin, being confined in the slots 45 and 46, prevents relative rotation of the shaft and section 16, while yet permitting axial adjustment within the limits prescribed by the length of these slots. In this way, an expensive slot and key connection between section 16 and extension 43 is obviated.

As the pulley structure 11 is adjusted by the aid of a hand wheel 40, the movable section 16 of the driving pulley 10 is automatically moved to accommodate pulley structure 10 to the prescribed belt requirement. To accomplish this, the pulley section 16 is urged resiliently toward the section 15. In the present instance, this is compactly provided for by accommodating a compression spring 49 inside of the hollow extension 43. A guide screw 50 is threaded into the end of the hollow extension 43, and serves as an abutment for the right hand end of the spring 49. Its left hand end engages the pin 48 and urges the section 16 with a yielding force toward the stationary member 15.

If the adjustable pulley structure 11 has its effective diameter increased, then the belt 12 exerts an expanding force between sections 15 and 16, due to its wedging action, and causes the section 16 to be urged toward the right, compressing the spring 49. Similarly, if the effective diameter of pulley structure 11 is decreased, the belt 12 is slackened on pulley structure 10, and this slacking is taken up immediately by movement of the pulley section 16 toward the left under the force exerted by the compression spring 49.

As shown most clearly in Fig. 1, the axial movement of the hub 47 of the adjustable section 16 may be so great as to cause this hub to extend beyond the right hand wall of casing 1. In order to permit this movement, use is made of a removable cap 51, forming an extension of the casing 1.

In order to provide lubrication between the sliding surfaces of hub 47 and the tubular extension 43, a shallow oil groove 52 is provided in the inner surface of the hub. This groove can be filled with oil, through an aperture. This aperture can be closed, as by the aid of a screw 53. Even a slight amount of lubricant so confined will last for an extended period.

It is sometimes necessary to replace or remove the belt 12. This can be very readily accomplished in the mechanism shown. To do this, the shaft 8 is withdrawn as hereinbefore described. The cap 51 is removed and the belt 12 which can pass between the sections 13 and 14 (the shaft 8 being removed) can be looped completely around the section 16 and out through the aperture 54 in the wall of the casing. This aperture is made large enough to permit this action. Replacement of the belt is accomplished in a similar manner. It is first passed through aperture 54 and looped between the sections 15 and 16. Then the belt 12 is passed between the sections 13 and 14. The shaft 8 can then be replaced.

It is also to be noted that pulley structure 10 has a maximum diameter which is always less than the minimum diameter of pulley structure 11. In this way, there is an assurance that the maximum speed of shaft 8 will be always less than the speed of shaft 7.

Figure 3:
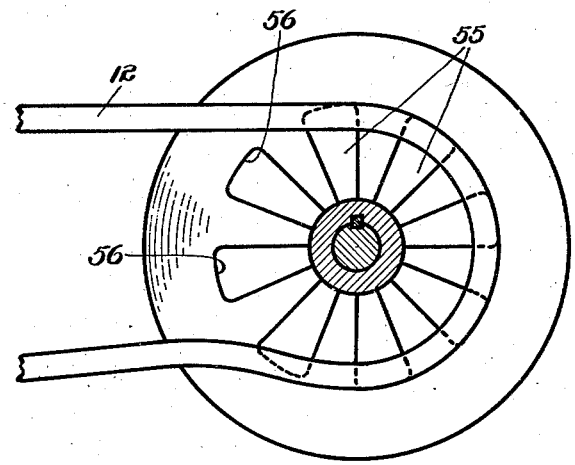
Figs. 3 and 4 are diagrams illustrating the action of the belt in connection with an adjustable pulley.

Both pulley structures 10 and 11 of course must be brought close together to obtain the maximum effective diameter. In order to accomplish this, it has been proposed to provide a series of radial grooves in the opposed faces and near the hub, thereby forming alternate slots and projections. In this way the axially adjustable sections, when moved together, will cause an interlocking or an interleaving of these slots and projections. Such an arrangement of slots is indicated at 55 in Fig. 3. In this arrangement, the slots 55 are shown as of uniform radial length. Should the belt 12 be riding on the pulley sections so that its outer edge is substantially in line with the end of the slots 55, as is shown in Fig. 3, there is a tendency for this edge of the belt to stick underneath the edges 56 formed at the end of the slots. This results in undue wear on the belt and a non-uniform drive, because the belt is carried around beyond a position where it should leave the pulley face in a tangential direction. This condition is shown in Fig. 3, at the lower reach of belt 12.

Figure 4:
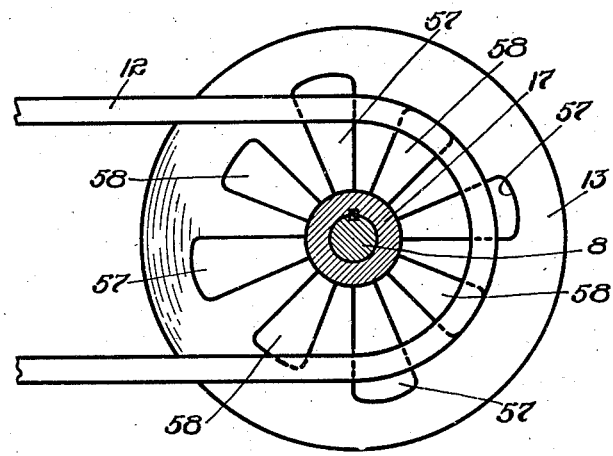

This difficulty is overcome in the present invention by making the slots of non-uniform radial lengths. Thus in Fig. 4, the slots 57 are made substantially longer than the alternating slots 58. In this way, the possibility of the belt sticking under the overhanging edges of the slots is greatly reduced, and the belt wears longer. This is due to the fact that the outer edge of the belt 12 is not at any time in alinement with any more than one or two of the slot edges.

I claim:—

1. In an adjustable pulley structure having a pair of relatively axially adjustable pulley sections, each of the sections having inclined belt engaging faces, whereby relative axial adjustment produces a corresponding variation in effective pulley diameter, and in which there are interengaging slots and projections in the inclined faces to permit said sections to be brought close together for large effective pulley diameter settings, characterized by the fact that the intersections of the bottoms of the slots with the conical surfaces of the pulleys do not lie on a single concentric circle.

2. In an adjustable speed power unit, in combination, two adjustable pulley structures, each of said pulley structures having a pair of relatively adjustable pulley sections, each of the sections having inclined belt engaging faces, whereby relative axial adjustment produces a corresponding variation in effective pulley diameter, a pair of shafts respectively in axial driving relation to said pulley structures, a belt engaging both of said pulley structures and encircling the two shafts, a casing enclosing said pulley structures, and a removable cap for the casing adjacent one of said pulley structures, whereby the belt can be passed in and out of the casing and whereby said belt can be passed over the end of the shaft supporting said pulley structure.

3. In an adjustable speed power unit, a shaft, an adjustable pulley structure in axial driving relation to said shaft, said adjustable pulley structure having a pair of relatively axially adjustable pulley sections, each of the sections having inclined belt engaging faces, whereby relative axial adjustment produces a corresponding variation in effective pulley diameter, a casing having walls enclosing said pulley structure, a bearing structure for said shaft, said bearing structure forming substantially the sole means for rotatably supporting said shaft, and means for supporting said bearing structure on one wall of said casing.

4. In an adjustable pulley structure having a pair of pulley sections with opposed inclined faces forming by relative axial adjustment variable effective pulley diameters, a shaft upon which said sections are mounted, said shaft having a hollow portion, as well as being slotted, a member fastened to one of the sections and extending through the slot formed in said shaft into the hollow portion, a compression spring in the hollow portion for urging said member in the direction required to maintain the pulley at the adjusted effective diameter, and an axially adjustable member supported within the hollow portion of said shaft for adjusting the force exerted by the compression spring.

5. In an adjustable pulley structure having a pair of pulley sections with opposed inclined faces, forming by relative axial adjustment variable effective pulley diameters, an axially extending member secured to one of said pulley sections, said axially extending member having a hollow chamber formed therein, the other of said pulley sections being supported on said axially extending member, a member secured to the pulley section which is supported on the axially extending member and extending into said hollow chamber, a compression spring for urging said member and the associated pulley structure in the direction required to maintain the pulley at the adjusted effective diameter, and an axially adjustable member supported within said hollow chamber for adjusting the force exerted by the compression spring.

6. The structure as set forth in claim 5, in which said axially adjustable member has a thread formed thereon and which engages a thread formed on said axially extending member.

7. In an adjustable speed drive, an adjustable pulley structure having a pair of pulley sections with opposed inclined faces forming by relative axial adjustment variable effective pulley diameters, a belt in active power transmitting relation to said pulley structure, a shaft in coaxial driving relation to said pulley structure, and a bearing structure cooperating with said adjustable pulley structure for rotatably supporting the adjustable pulley structure and the associated shaft, a frame having means for supporting said bearing structure, said frame and said bearing structure providing means for supporting the pulley sections of said adjustable pulley structure in fixed axial position when the shaft and belt are removed from the assembly.

8. In an adjustable pulley structure having a pair of relatively axially adjustable pulley sections, with opposed inclined belt engaging faces, forming by relative axial adjustment variable effective pulley diameters, each of said pulley sections having a hub, a shaft in coaxial driving relation to said pulley structure, a pair of bearing structures respectively axially fixed to each of said hubs, means for restricting the axial movement of said shaft, and means for supporting said bearing structures so as to rotatably support said shaft.

9. In an adjustable pulley structure having a pair of pulley sections with opposed inclined faces forming by relative axial adjustment variable effective pulley diameters, each of said pulley sections having a hub, a shaft upon which said pulley structure is mounted, means for rotatably supporting said shaft, said rotatably supporting means including a pair of bearing structures respectively axially fixed to each of said hubs, means for supporting said bearing structures to rotatably support said shaft, and means for axially moving one of said bearing structures to adjust the axial position of the pulley section associated therewith.

10. In an adjustable speed power unit, a driving shaft, a driven shaft, means for transmitting power at an adjustable speed ratio from said driving shaft to said driven shaft, said adjustable speed transmission including a pair of adjustable pulley structures in respective axial driving relation to each of said shafts and a belt for transmitting power between the two pulley structures, each of said pulley structures including a pair of pulley sections with opposed inclined faces, forming by relative axial adjustment variable effective pulley diameters, an electric motor in coaxial driving relation to said driving shaft, said electric motor having bearing structures rotatably supporting said driving shaft, said bearing structures forming substantially the sole means for rotatably supporting said driving shaft, a casing having walls enclosing said pulley structures, and means for supporting said electric motor on one wall of said casing, so that said wall of said casing forms substantially the sole means for supporting said electric motor, said driving shaft and the pulley structure mounted thereon.

11. In an adjustable speed power unit, an electric motor having a frame and a shaft projecting from the frame, a driven shaft, means for transmitting power at an adjustable speed ratio from said motor shaft to said driven shaft, said adjustable speed transmission including a pair of adjustable pulley structures in respective axial driving relation to each of said shafts and a belt in active driving relation to said pulley structures, each of said pulley structures having a pair of pulley sections with opposed inclined faces, forming by relative axial adjustment variable effective pulley diameters, means for adjusting the effective diameter of at least one of said pulley structures, a casing having walls enclosing said pulley structures, means cooperating with said casing for supporting said driven shaft, and means for supporting said motor by said casing, said motor supporting means including an aperture formed in the wall of said casing adjacent said motor through which the shaft of said motor projects into said casing, and means for securing said motor to said casing so that the frame of said motor forms a removable cover for said aperture, and so that the wall of said casing adjacent to said aperture forms substantially entirely the sole means for supporting the frame of said motor.

12. In an adjustable speed power unit, a driving shaft, a driven shaft, means for transmitting power at an adjustable speed ratio from said driving shaft to said driven shaft, said adjustable speed transmission including a pair of adjustable pulley structures in respective axial driving relation to each of said shafts and a belt for transmitting power between the two pulley structures, an electric motor having a frame, said electric motor being in coaxial driving relation to said driving shaft and providing substantially the sole means for rotatably supporting said driving shaft, a casing having walls enclosing said pulley structures, and means for substantially entirely supporting said electric motor on one wall of said casing, said means for supporting said motor including a tubular aperture formed in the wall of said casing into which a portion of the motor frame projects and means for securing said motor frame to the wall of said casing adjacent said aperture so that the frame of said motor forms a removable cover for said aperture.

13. In an adjustable speed power unit, a driving shaft, a driven shaft, means for transmitting power at an adjustable speed ratio from said driving shaft to said driven shaft, said adjustable ratio transmission including a pair of adjustable pulley structures in respective axial driving relation to each of said shafts, each of said pulley structures having a pulley section axially fixed with respect to its respective shaft and a pulley section axially adjustable with respect to the fixed pulley section, said pulley sections having opposed inclined faces forming by relative axial adjustment variable effective pulley diameters, means for adjusting the effective diameter of at least one of said pulley structures, a casing having walls enclosing said pulley structures, an electric motor in coaxial driving relation to said driving shaft, said electric motor having a frame, and means for supporting the frame of said motor on said casing, said motor supporting means including an aperture formed in the wall of said casing through which said driving shaft projects from the motor to the driving pulley structure and means for securing the frame of said motor to the wall of said casing adjacent said aperture, whereby said wall of said casing forms substantially the sole means for supporting the frame of said motor.

14. In an adjustable speed drive, an adjustable pulley structure having a pair of pulley sections with opposed inclined faces, forming by relative axial adjustment variable effective pulley diameters, a shaft in coaxial driving relation to said pulley structure, a casing enclosing said pulley structure, and means for adjusting the axial position of one of said pulley sections, said axially adjusting means including a hub provided for the adjusted pulley section, a bearing engaging said hub, an axially adjustable member engaging said bearing, a removable cover provided for said casing, and means for supporting said axially adjustable member and the pulley section associated therewith on said removable cover independently of said shaft.

15. In an adjustable speed power unit having a driving pulley structure, a driven pulley structure, a flexible driving member for transmitting power from the driving pulley structure to the driven pulley structure, one of said pulley structures having an adjustable effective diameter, and an electric motor having a frame and a shaft in coaxial driving relation to the driving pulley structure; the combination therewith of a casing having walls enclosing said pulley structures, a load driving shaft driven by the driven pulley structure and extending out of said casing, one of said walls having an aperture through which the motor shaft extends into the casing, said motor frame and said apertured wall being provided with cooperating supporting surfaces, by the aid of which surfaces said motor is so supported by said wall that the motor frame substantially entirely closes said aperture and extends a substantial distance externally of the wall of the casing.

16. In an enclosed adjustable speed drive, a driving shaft, a driven shaft, a driving pulley structure mounted on said driving shaft, a driven pulley structure mounted on said driven shaft, a belt for transmitting power between said pulley structures, each of said pulley structures having an adjustable effective diameter and including a pair of pulley sections having opposed inclined faces, forming by relative axial adjustment variable effective pulley diameters, a casing having walls enclosing said pulley structures, and means for supporting said shafts on said casing, said means for supporting one of said shafts on said casing including a bearing structure for said one shaft, said bearing structure forming substantially entirely the sole means for rotatably supporting said shaft, and means for supporting said bearing structure entirely on one wall of said casing.

17. In an enclosed electrically driven variable speed power unit, an electric motor including a stator and a shaft, a driven shaft, a driving pulley structure mounted on said motor shaft, a driven pulley structure mounted on said driven shaft, a belt in active driving relation to said pulley structures and encircling said shafts, each of said pulley structures having an adjustable effective diameter and including a pair of pulley sections with opposed inclined faces, forming by relative axial adjustment variable effective pulley diameters, means for oppositely adjusting the effective diameters of said adjustable pulley structures, a casing enclosing said belt and pulley structures, a load driving means projecting outside of said casing, said casing having a pair of opposite facing walls, one of said walls having an aperture formed therein through which said motor shaft projects into said casing, means forming a removable cover for said aperture, said removable cover providing means for supporting the stator and shaft of said electric motor on said one wall of said casing, the wall of said casing opposite to said motor supporting wall having an aperture formed therein adjacent to the end of said motor shaft, means for supporting one end of said driven shaft on one of said opposite facing walls, and the wall adjacent to the other end of said driven shaft having an aperture formed therein, means associated with said apertures formed in the walls of said casing adjacent to the ends of said driving and driven shafts whereby the driving belt may be passed over the ends of the driving and driven shafts and in or out of the casing, during assembly or replacement of the belt, without the necessity of removing said driving or driven pulley structures from said casing.

18. In an enclosed electrically driven variable speed power unit, an electric motor including a stator and a shaft, a driven shaft, a driving pulley structure mounted on said motor shaft, a driven pulley structure mounted on said driven shaft, a belt in active driving relation to said pulley structures, each of said pulley structures having an adjustable effective diameter and including a pair of pulley sections with opposed inclined faces, forming by relative axial adjustment variable effective pulley diameters, means for oppositely adjusting the effective diameters of said adjustable pulley structures to adjust the speed ratio of the variable speed drive, a casing having walls enclosing said belt and pulley structures, a load driving means projecting outside of said casing, one wall of said casing having an aperture formed therein through which said motor shaft projects into said casing, means forming a removable cover for said aperture, said removable cover providing substantially the sole means for supporting the stator and shaft of said electric motor and said driving pulley structure on said one wall of said casing, and means for supporting said driven shaft on said casing.

19. In an enclosed electrically driven variable speed power unit, an electric motor including a frame and a shaft, a driven shaft, a driving pulley structure mounted on said motor shaft, a driven pulley structure mounted on said driven shaft, a belt in active driving relation to said pulley structures, each of said pulley structures having an adjustable effective diameter and including a pair of pulley sections with opposed inclined faces, forming by relative axial adjustment variable effective pulley diameters, means for oppositely adjusting the effective diameters of said adjustable pulley structures to adjust the speed ratio of the variable speed drive, a casing having walls enclosing said belt and pulley structures, means cooperating with said casing for rotatably supporting said driven shaft, a load driving means projecting outside of said casing, one wall of said casing having an aperture formed therein through which said motor shaft projects into said casing, the frame of said motor forming a removable closure for said aperture and providing substantially entirely the sole means for supporting said motor shaft and driving pulley structure, said aperture and said motor frame cooperating to provide means whereby said motor frame together with said motor shaft and said driving pulley structure may be removed from the assembly of the power unit as a single element by a movement of said motor frame in a direction substantially parallel to the axis of said motor shaft.

20. In an enclosed electrically driven variable speed power unit, an electric motor having a frame and a shaft, an adjustable pulley structure mounted on said motor shaft and driven thereby, the frame of said electric motor providing substantially entirely the sole means for supporting said motor shaft and the pulley structure driven thereby, a driven shaft, a driven pulley structure mounted on said driven shaft, a belt for transmitting power between said pulley structures, each of said pulley structures having an adjustable effective diameter and including a pair of pulley sections with opposed inclined faces, forming by relative axial adjustment variable effective pulley diameters, resilient means for urging the pulley sections of said driving pulley structure into driving relation with said belt, whereby the axial forces exerted by said resilient means and by said belt on said pulley sections provide substantially the sole means for adjusting the effective diameter of said driving pulley structure, a casing having walls enclosing said pulley structures and said belt, said casing having a pair of opposite facing walls, one of said opposite facing walls having an aperture formed therein through which said motor shaft projects into said casing, means cooperating with said pair of opposite facing walls for rotatably supporting said driven shaft and said driven pulley structure, and a screw mechanism enclosed by the casing and having an operating end extending through one of said opposite facing walls to the exterior of the casing for positively adjusting the relative axial positions of the pulley sections of said driven pulley structure to adjust the speed ratio of said variable speed power unit.

21. In an adjustable speed drive, a driving pulley structure, a driven pulley structure, a belt in active driving relation to said pulley structure, one of said pulley structures having an adjustable effective diameter and including a pair of pulley sections having opposed inclined faces, forming by relative axial adjustment variable effective pulley diameters, each of said pulley sections having a hub, a shaft coaxial with said pulley sections and in driving relation thereto, a frame, and means for rotatably supporting said shaft and said pulley sections on said frame, said rotatably supporting means including a pair of bearing members, means for respectively securing one of said bearing members to each of said hubs, and means for supporting said bearing members on said frame so that the axial positions of said pulley sections are positively determined thereby independently of said shaft, said rotatably supporting means providing means whereby said belt may be removed from the adjustable pulley structure, upon removal of the shaft and without removing said pulley sections from said frame, by passing the belt between the opposite facing pulley sections of said adjustable pulley structure.

22. In an adjustable speed power unit having an electric motor, a driving pulley structure, a driven pulley structure, a flexible driving member for transmitting power from the driving pulley structure to the driven pulley structure, each of the pulley structures having an adjustable effective diameter and including a pair of sections with the opposed inclined faces, forming by relative axial adjustment variable effective pulley diameters, and a shaft driven by the motor and in coaxial driving relation to the driving pulley structure, and in which the driven pulley structure is in driving relation to a load driving shaft; the combination therewith of a casing having walls enclosing said pulley structures, said casing having an aperture formed in the wall of said casing adjacent to said motor through which the shaft of said motor projects into said casing, said motor having a supporting surface engaging a supporting surface formed on the casing, said surfaces serving to support said motor.

23. The structure as set forth in claim 22, in which there is another aperture formed in the casing wall opposite the aperture through which the motor shaft projects, said motor driven shaft being unsupported in said opposite wall, and in which a removable cover is provided for said other aperture, which aperture provides access to the pulley structure for removal of the belt.

24. In an adjustable speed drive, a pair of pulley structures, at least one of said structures having a pair of relatively axially adjustable sections having opposed inclined faces, forming by relative axial adjustment, variable effective diameters, a shaft for each pulley structure, a belt connecting the pulley structures, a casing enclosing the structures and the belt, bearing structures entirely supported by the casing, and a source of rotary motion supported by the casing and extending out of the casing, said source of motion being in coaxial driving relation with one of the shafts.

DON HEYER.